United States Patent [19]

Harrison et al.

[11] 4,189,882
[45] Feb. 26, 1980

[54] TRANSLUCENT ROOFING MEANS

[75] Inventors: Henry Harrison; Henry C. Harrison, both of Locust Valley, N.Y.

[73] Assignee: Halm Instrument Co., Inc., Glen Head, N.Y.

[21] Appl. No.: 737,611

[22] Filed: Nov. 1, 1976

[51] Int. Cl.² .......................... E04B 1/00; E04C 1/34; E04D 1/36
[52] U.S. Cl. .......................................... 52/222; 52/63; 52/460; 52/466; 52/467; 52/468; 52/509; 52/586
[58] Field of Search ................. 52/459, 465, 460, 202, 52/461, 222, 476, 273, 467, 506, 468, 63, 466, 309, 573, 586

[56] References Cited

U.S. PATENT DOCUMENTS

| 248,645 | 10/1881 | Geddes | 52/459 X |
|---|---|---|---|
| 1,787,540 | 1/1931 | Martinson | 292/202 |
| 1,931,750 | 10/1933 | Blaski | 52/460 X |
| 2,907,287 | 10/1959 | Trostle | 52/467 X |
| 3,295,282 | 1/1967 | Belcher, Jr. | 52/460 |
| 3,312,026 | 4/1967 | Rolland | 52/460 X |
| 3,314,203 | 4/1967 | Hill et al. | 52/461 X |
| 3,323,819 | 6/1967 | Barker | 52/466 X |
| 3,341,999 | 9/1967 | Berg | 52/460 X |
| 3,387,415 | 6/1968 | McFarlane | 52/459 X |
| 3,895,468 | 7/1975 | Bernstein | 52/222 |

FOREIGN PATENT DOCUMENTS

| 209725 | 2/1956 | Australia | 52/466 |
|---|---|---|---|
| 263657 | 3/1965 | Australia | 52/461 |
| 645270 | 7/1962 | Canada | 52/63 |
| 1126581 | 3/1962 | Fed. Rep. of Germany | 52/459 |
| 219994 | 4/1968 | Sweden | 52/222 |

Primary Examiner—Leslie Braun
Attorney, Agent, or Firm—James P. Malone

[57] ABSTRACT

Roofing means including a roof panel. Means are provided for securing the roof panel onto a roof frame including elastic clamping means joining the panel in tensioned relation to the frame and a deformable elastic sealing member secured between the clamping means and the panel and covering the clamping member. The roof panel may be a thin translucent plastic sheet.

5 Claims, 4 Drawing Figures

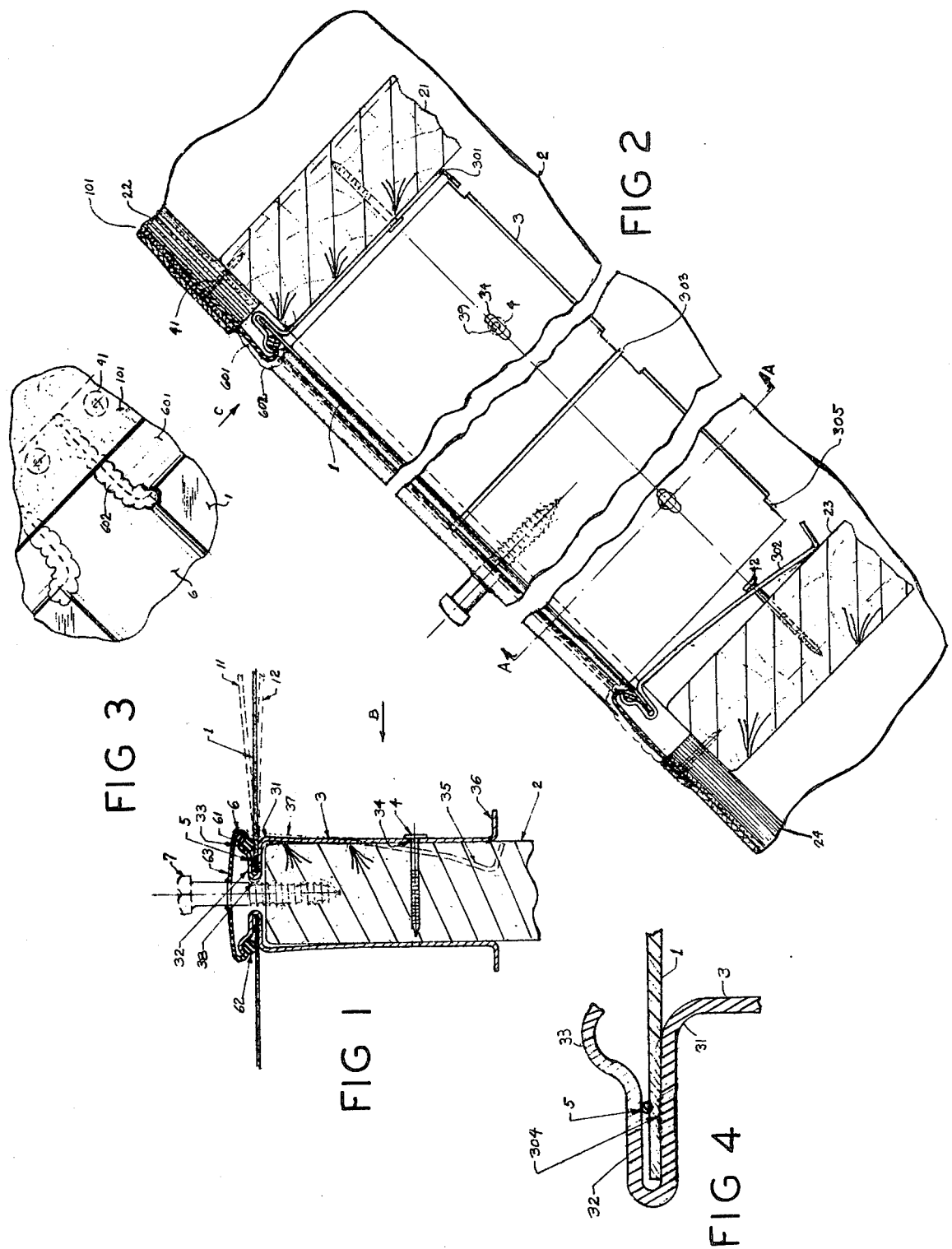

TRANSLUCENT ROOFING MEANS

This invention relates to translucent roofing means, and more particularly to translucent plastic roof panels.

In solar heated houses there is sometimes a need for a translucent roof which will admit sunlight freely while excluding rain and air infiltration. Glass, is fragile, heavy and more costly material than certain plastics like fiberglass-reinforced polyester, which are tougher, lighter, less expensive and have a pleasing non-specular surface. When subjected to normal loads from wind pressure or snow, however, a plastic panel deflects out of a plane and the distance between its edges draws together a little. If such a panel is sealed at its edges to a rigid frame this action can break the seal and cause leaks to develop. At the same time, the panel and the frame would conveniently be made of materials having different coefficients of thermal expansion and different dimensional response to moisture, and are frequently exposed to quite different temperatures, which causes additional working of the sealed edges.

A thin plastic panel has little plate strength, but it can support very substantial pressures as a membrane if it is stretched like a drum head or trampoline and the edges are allowed to pull in when the surface bulges out of a plane.

From the preceding brief analysis it becomes clear that tough, relatively thin, translucent plastic panels are preferred for glazing a transparent roof. Also, the panels should be secured to the rigid roof frame by elastic members which will subject the panels to tension but will permit them to bulge under pressure loading or expand under temperature changes without relative motion in the edge seals.

Accordingly, it is a primary object of this invention to provide a practical, aesthetically pleasing translucent roofing system which withstands normally encountered extreme ambient temperature cycling, positive and negative wind pressure fluctuations, snow loads and shock loads from hail and incidental dropped or thrown objects while durably sealing against entry of wind and rain water.

It is another object of this invention to provide a translucent roofing system which can be assembled on site rapidly by a step-by-step process without the use of special tools or special skills; and can be readily disassembled if corrections or panel replacements are required.

It is a very important secondary object to provide a translucent roofing system constructed of low cost parts within the range of well developed fabrication technology.

Another object of this invention is to provide roofing means comprising a roof panel, means for securing the roof panel onto a roof frame comprising elastic clamping means joining said panel in tensioned relation to said frame and a deformable elastic sealing member secured between said clamping means and said panel and covering said clamping member.

These and other objects will become apparent from a study of the following description and drawings.

FIG. 1 is a cross-sectional view of the parts of this roofing system assembled to a wooden roof beam. The section view of FIG. 1 is indicated by the plane A—A in FIG. 2.

FIG. 2 is a broken-away partial section view of a roof viewed in the direction B of FIG. 1.

FIG. 3 is an outside view in direction C of FIG. 2, showing how the corners of the seal system may be finally closed with an elastic sealant.

FIG. 4 is an enlarged partial detail of the clamping member.

In FIG. 1, translucent plastic panels 1, are shown secured to roof beam 2, by clamping members 3. These clamping members are secured to the beam by ring nails 4. The panels are frictionally secured in the clamping members by wire splines 5. Rain water is excluded by an elastic seal strip 6. A lag bolt 7, penetrating the seal strip, may be screwed into the beam to act as a lug, for supporting a ladder to facilitate maintenance of a sloping roof.

Athough for illustration the roof system is shown in conjunction with wooden framing members, adapting it to framing members of other materials, of steel, aluminum, plastics or concrete, for example, would be obvious to those skilled in the art.

The clamping member 3, is preferably of metal having substantial strength and resilience, and may be of low carbon steel strip about one-sixteenth of an inch thick. Since the clamping member is completely sealed from outside weather, it is not necessary to galvanize, electro-plate or paint it for protection against corrosion.

The clamping member is bent into a contour having an approximately 90° bend at 31, and a 180° bend producing a channel 32 of controlled inside spacing which clamps the panel 1, and the wire spline 5 tightly. A wider overhung channel 33 accepts and retains the edge bead of the seal strip 6.

The clamping member 3 is provided with one or more perforations 34, for nails 4, attaching it to the beam 2. Since the panel length expands and contracts differently than the beam 2, the holes 34 are slotted, as shown in FIG. 2. Each hole may have a central notch 39 for conveniently centering the nails at assembly.

Before assembly the clamping member 3 is prebent to a substantially curved contour 35. Thus, when the nails 4 are driven it is elastically flattened and springs tightly against the beam. The flange 36 serves to reinforce the lower edge of the clamping member so that the nails may be spaced apart without serious longitudinal buckling of the clamping member. Clamp 3 may also be used to retain a solar collector or other device (not shown), which one wishes to hold in fixed relation with the translucent panel.

As illustrated in FIG. 4, the lower middle wall of the channel 32 may be provided with ridges or serrations 304 which are pressed into the plastic surface of panel 1 when the spline wire 5 is forced into place. This prevents the panel from working out of the channel under repeated temperture cycling which causes slight differential movement between the metal clamping member 3 and the plastic panel 1.

It will be evident to those skilled in the art that the contour of this clamping member can be economically produced by known techniques of stamping, brake forming, or preferably roll forming from metal strip.

The seal member 6 is extruded from an elastomer which can withstand outdoor weathering, sunlight, ozone, and the expected outdoor temperature range without losing its elasticity. Silicone rubber is one such material. It consists of a tough web section 63 bordered by edge beads 61 and 62 which have accurately sized sections.

FIG. 2 shows how a roof may be constructed using this roofing system, especially how expansion may be accommodated and weatherproof joints may be made with roofing at the top and bottom edges of a panel.

The clamping member 3 may have a different coefficient of thermal expansion than the panel 1. Therefore, to restrict relative motion of the clamping member and the panel where they are frictionally secured together, the clamping member is preferably less than two feet long. To hold a long panel, a plurality of clamps is required, initially spaced apart by spaces such as 303 to allow for differential expansion of the panel and the beam. These gaps should be ⅛ inch or less because although the panel is continuous, the seal bead 61 is less completely confined there and the stiffness of the seal is relied upon to make a continuous contact with the panel.

At the upper and lower ends of the panel, the roof framing includes wooden bridging members 21 and 23, and the roof is sheathed with plywood 22 and 24, covered with built-up roofing 101. Clamping members 301 and 302 are secured to the cross-members 21 and 23 by nails. They may be identical to clamping members 3. Notching the flange 36 at both ends of each clamping member, as at 305, prevents interference of the flanges at the corners.

The upper and lower elastic seal members 601 may be formed from seal strip 6 by slitting off one edge bead, such as 62. The remaining edge bead is secured against the panel by the cavity 33 of the clamping member, and the web 63 of the seal is layered under the roofing 101, at the top in water-shedding flashed relation, and secured to the roof sheathing by roofing nails 41. Mastic roofing cement is used to make the joint water-tight.

Of course one-bead seal members of any desired width could be used instead of cut-down two bead seals for making these joints to the roofing. Similar seals interleaved with roofing may be used on the sides of the translucent opening.

At the lower end of the panel the nails 42, securing the clamping member 302, are not tightly driven, but are sufficient to restrict motion of the panel toward or away from the roof. This allows for assembly, as will be described, and also permits the larger differential motion expected at the end of a long panel. The web portion of the seal is interleaved under the top layer of the roofing, again in water-shedding, flashed relation, and secured with nails and roofing cement.

To assemble a roof according to this roofing system, the craftsman first nails a series of clamping members to the sides of the roof beams around the openings to be glazed. The channel portion 32 of the clamping members may be rested against the edge of the beam to gauge the location of the clamping members. Temporary spacers may be placed against the edge of the beam between the clamping members to space them elastically about 1/16 inch from the beam for assembly of the translucent panels.

The precut translucent panel is next flexed to slip into the channels 32 of the clamping members along the sides and then slid upward into the channel of the upper end clamping member 301. The channel of the lower clamping member is then slipped over the lower edge of the panel, and this lower clamping member is temporarily secured in place. The spline wire 5 is now forced into the channel firmly securing the edge of the panel to the clamping members. When the panel is secured in place, the temporary spacers, etc. restraining the clamping members are removed.

The seal strips 6 are applied over the beams by forcing the edge beads 61 and 62 into the overhung channels 33. Ends of the strips are trimmed to be leaved with the roofing as indicated in FIG. 3. The seal strips 601 at the ends of the panels are similarly assembled, and are trimmed at the ends to make a sealable joint with the seal strips 6 along the beams. Final closure of the corner joint is by means of a bead 602 of elastic sealant cement which may be silicone rubber sealant. Layered roofing is then completed in the adjacent areas and secured by nails and roofing cement.

If a panel or a clamping member is damaged or incorrectly assembled, it can be disassembled from the roof without disturbing the other panels. The seal bead 61 is first stripped out of the overhung channel 33. Then the wire spline 5, which can be reached at the ends of the clamping members and at the spaces 303 between them, is stripped out of the channel 32. Then the panel can be flexed and disengaged from channel 32 and set aside. Thus, disassembly of the panel does not in itself destroy the panel or any other parts of the system.

When the roof is put back, the clamping members must again be temporarily spaced out so that the roof panels will be under tension when the wire splines have been driven in.

An assembled roof of this kind is able to support snow loads and positive and negative wind pressures. It bulges inward or outward as indicated by the dotted lines 11 and 12 in FIG. 1, elastically deflecting the clamp member 3, as indicated by the dotted line 37. But when the applied pressure drops back to zero, the clamp members stretch the panel flat again. When temperature changes occur, the panel may expand relative to the frame, and the clamp member 3 will then draw in elastically and reversibly as indicated by the dotted line 38, as the panel increases in width. The corresponding length increase causes the clamp members 3, to slip along the beam 2, under the heads of the nails 4, as permitted by the slots 34. The clamp member 302 also moves toward the frame member 23.

These various deformations take place without causing any relative motion of the panel with respect to the seal bead 61, although the web of the seal is elastically deformed. Because the clamp members are short, very little longitudinal differential slipping takes place inside the channel 32, so the panel remains firmly gripped by the spline wire 5, while the seal remains leak proof.

The foregoing specification describes a translucent roofing system which permits the entry of light while durably preventing the entry of wind and rain. It withstands all loads and temperature variations normally encountered. It can be systematically assembled or disassembled without the use of special tools. All the parts can be fabricated economically with known technology.

Although the invention has been described in terms of a roof, it is clearly also useful in the construction of other exterior building surfaces such as walls. Therefore, the words "roof" and "roofing system" and "roofing means" in this specification and claims are intended to mean any exterior surface of a building.

We claim:

1. Roofing means comprising a panel capable of withstanding tension loads, means for securing the panel onto a frame comprising an elastic tensioned clamping member joining said panel in tensioned relation to said frame and a deformable elastic sealing member secured between said clamping member and said panel, said elastic clamping member comprises a clamping member having a channel adapted to receive the edge of said panel and a spline which can be jammed into said channel together with said panel edge to hold said panel edge in firm frictional clamped relation with said clamping member.

2. Roofing means according to claim 1, in which said deformable elastic sealing member is a strip of weather-resistant elastomer having at least one sealing bead and said clamping member has an overhung channel suitable to hold said sealing bead in compressed sealing contact with said panel.

3. Roofing means according to claim 2, in which said clamping member has an outer portion extending outside the plane of said panel, and said elastic seal member has a web portion which covers said outer portion of said clamping member to protect said clamping member from corrosion by rain.

4. Roofing means according to claim 1, in which said clamping member includes a prebent portion which is elastically straightened upon assembly to a beam of the said roof frame to maintain tension in said panel.

5. Roofing means according to claim 1, in which at least the lower inside face of said channel has projections which engage the surface of the said panel.

* * * * *